(12) United States Patent
Hakes

(10) Patent No.: US 10,232,204 B2
(45) Date of Patent: Mar. 19, 2019

(54) EXPLOSION ISOLATION DEVICE AND METHOD FOR DISPOSING DUST

(71) Applicant: David Hakes, Naperville, IL (US)

(72) Inventor: David Hakes, Naperville, IL (US)

(*) Notice: Subject to any disclaimer, the term of this patent is extended or adjusted under 35 U.S.C. 154(b) by 229 days.

(21) Appl. No.: 14/986,881

(22) Filed: Jan. 4, 2016

(65) Prior Publication Data

US 2017/0189841 A1 Jul. 6, 2017

(51) Int. Cl.
| | |
|---|---|
| *B01D 47/00* | (2006.01) |
| *A62C 3/04* | (2006.01) |
| *B01D 45/12* | (2006.01) |
| *B01D 45/02* | (2006.01) |
| *B01D 50/00* | (2006.01) |
| *B01D 45/06* | (2006.01) |
| *B01D 45/18* | (2006.01) |

(52) U.S. Cl.
CPC ............ *A62C 3/04* (2013.01); *B01D 45/02* (2013.01); *B01D 45/12* (2013.01); *B01D 45/06* (2013.01); *B01D 45/18* (2013.01); *B01D 50/002* (2013.01)

(58) Field of Classification Search
CPC ........ A62C 3/04; B01D 45/12; B01D 50/002; B01D 45/02; B01D 45/06; B01D 45/18
See application file for complete search history.

(56) References Cited

U.S. PATENT DOCUMENTS

| | | | | |
|---|---|---|---|---|
| 2,216,249 | A * | 10/1940 | Nelson ................. | A47L 9/20 15/160 |
| 4,133,658 | A * | 1/1979 | Callewyn ............. | B01D 45/12 15/314 |
| 5,259,854 | A * | 11/1993 | Newman ............. | B01D 46/0024 251/65 |
| 5,882,379 | A * | 3/1999 | Johnson .............. | B01D 46/0086 55/302 |
| 6,171,353 | B1 * | 1/2001 | Park ..................... | B01D 45/18 422/173 |
| 6,221,135 | B1 * | 4/2001 | Wirth, Jr. ............ | A47L 5/365 55/356 |
| 6,471,751 | B1 * | 10/2002 | Semanderes ....... | B01D 45/12 55/300 |
| 6,507,974 | B1 * | 1/2003 | Cheng .................. | A47L 5/365 15/347 |
| 6,797,046 | B2 * | 9/2004 | Wang .................. | B01D 46/0065 55/283 |

(Continued)

*Primary Examiner* — Dung H Bui
(74) *Attorney, Agent, or Firm* — Donald Flaynik

(57) ABSTRACT

An explosion isolation device for collecting dust discharged from a hopper into a dust collection drum that eliminates an airlock requirement to isolate the negative pressured dust collector from receiving air via a bottom aperture in the lower portion of the hopper, thereby preventing an explosion in the dust collector that exceeds the pressure rating of the device and dust collection drum. The explosion isolation device includes a spool member detachably secured to a drum cover having an aperture configured and dimensioned substantially similar to an aperture through the spool member. The drum cover is detachably secured to the dust collection drum via a drum cover clamp, which is secured to the spool member or alternatively to the drum cover such that the clamp is suspended beneath the drum cover when the dust collection drum is full and replaced by an empty drum.

9 Claims, 10 Drawing Sheets

(56) References Cited

U.S. PATENT DOCUMENTS

| | | | | |
|---|---|---|---|---|
| 6,833,016 B2 * | 12/2004 | Witter | B01D 50/002 | 451/88 |
| 6,875,248 B1 * | 4/2005 | Shelton | B01D 46/002 | 55/341.1 |
| 7,044,991 B2 * | 5/2006 | Wang | B01D 46/0057 | 55/356 |
| 7,217,307 B2 * | 5/2007 | Cheng | A47L 5/22 | 55/356 |
| 7,282,074 B1 * | 10/2007 | Witter | B01D 45/12 | 451/453 |
| D593,264 S * | 5/2009 | Lin | D32/21 | |
| D604,464 S * | 11/2009 | Witter | D32/21 | |
| D629,576 S * | 12/2010 | Cheng | D32/21 | |
| D630,391 S * | 1/2011 | Cheng | D32/21 | |
| D630,392 S * | 1/2011 | Lin | D32/21 | |
| 8,029,590 B2 * | 10/2011 | Cheng | B01D 46/0016 | 15/347 |
| D651,776 S * | 1/2012 | Cheng | D32/21 | |
| 8,695,158 B2 * | 4/2014 | Cheng | B01D 46/42 | 15/323 |
| 9,017,441 B1 * | 4/2015 | Vemuri | B01D 45/18 | 55/432 |
| 9,399,184 B2 * | 7/2016 | Witter | A47L 9/1608 | |
| 2005/0257507 A1 * | 11/2005 | Tsai | B01D 45/18 | 55/428 |
| 2008/0016830 A1 * | 1/2008 | Witter | B01D 45/12 | 55/337 |
| 2008/0172996 A1 * | 7/2008 | McCutchen | B01D 45/18 | 55/432 |
| 2009/0025348 A1 * | 1/2009 | Cheng | B01D 45/02 | 55/385.1 |
| 2010/0218467 A1 * | 9/2010 | Witter | B01D 45/12 | 55/337 |
| 2011/0100225 A1 * | 5/2011 | Lin | B01D 45/12 | 96/421 |
| 2011/0219734 A1 * | 9/2011 | Lin | B03C 3/017 | 55/429 |
| 2016/0051921 A1 * | 2/2016 | Jin | B01D 45/12 | 55/432 |
| 2016/0088990 A1 * | 3/2016 | Anderson | B04C 5/185 | 55/429 |

* cited by examiner

EXPLOSION ISOLATION DEVICE AND METHOD FOR DISPOSING DUST

BACKGROUND OF THE INVENTION

1. Field of the Invention

This invention relates to an explosion isolation device for dust collector vessel, and more particularly, to an explosion isolation device that isolates a dust collection drum from a hopper of a dust collector vessel such that dust discharged from the hopper and ultimately deposited into the dust collection drum will not cause an explosion in the dust collector vessel that exceeds the pressure rating of the explosion isolation device and/or the dust collection drum.

2. Background of the Prior Art

Dust collection systems require deflagration isolation (subsonic flame propagation interruption) pursuant to the National Fire Protection Association ("NFPA"). More specifically, Chapter 11, Section 1.1 of the NFPA allows deflagration control by isolation, which pertains to the interruption or mitigation of flame, deflagration pressures, pressure piling, and flame-jet ignition between enclosures that are interconnected by pipes or ducts. Further, chapter 11, Section 1.2 of the NFPA provides that isolation control may be active, which requires the detection, control and response (pneumatic or electrical) to create an isolation barrier; or that isolation control may be passive, which requires a response to a deflagration pressure that generates an isolation barrier. A typical passive isolation control system includes a 55 gallon drum that receives dust discharged from a dust collector hopper.

Prior art active explosion isolation control devices and methods include air lock valves (typically gate valves) disposed between and connected to a bottom portion of a dust collector vessel, and connected to a top portion of a dust receiving container. The gate valve isolates the vacuum pressured dust collection vessel from the dust receiving container to prevent a relatively large quantity of air from entering dust collection vessel through a bottom opening in the vessel when dust is not exiting the vessel, thereby preventing an explosion inside the dust collection vessel that could reach a magnitude that exceeds the burst pressure rating of the dust collection vessel.

The problem with using a valve as an explosion isolation device is that the valve is relatively expensive to purchase and, because of dust accumulation upon the moving valve, relatively expensive to maintain. In the event that the valve is not regularly inspected, the valve can become difficult to operate, which can result in the dust collection system having to be shutdown to implement repairs.

Prior art passive explosion isolation control devices and methods include a 55 gallon drum that has a design pressure that exceeds the design pressure of the dust collector housing. The 55 gallon drum receives dust discharged from a dust collector hopper via a flexible tube or "chute." When the drum is full, it is transported to a location where the dust can be safely disposed and the drum "recycled" back to the dust collector for refilling.

The problem with prior art passive devices and methods that use 55 gallon drums is that the flexible tube is allows dust to "leak" from the system and become suspended in the surrounding air or become deposited upon the area surrounding the drum. Further, the time and manual effort required to replace a full drum with an empty drum is relative long, arduous and costly.

There is a need for an explosion isolation device and method that is relatively inexpensive to purchase, has no moving parts, that requires virtually no maintenance to keep the device and/or system operational, and that requires a relatively small amount of time and manual effort to dispose of the dust discharged from the dust collector. Further, the device and method must not compromising safety parameters or pressure ratings of a predetermined dust collector vessel or the vessel's cooperating dust collection system.

SUMMARY OF THE INVENTION

It is a principal object of the present invention to provide an explosion isolation device for dust collector vessel. A feature of device is a spool member disposed below and detachably secured to the dust collector vessel. Another feature of the device is a dust collection drum disposed below and detachably secured to the spool member. An advantage of the device is that relatively inexpensive components are required to fabricate the device. Another advantage of the device is that no moving parts are used. Still another advantage of the device is that no maintenance of the device is required to keep the device operational.

Another object of the present invention is to provide a device that maintains safety parameters and pressure ratings equal to or greater than the safety parameters and pressure ratings of a predetermined dust collector vessel and the vessel's cooperating dust collection system. A feature of the device is that the device includes safety parameters and a pressure rating at least equal to the pressure rating of the dust collector vessel. An advantage of the device is that the safety parameters and pressure ratings of the device are relatively inexpensive to achieve.

Another object of the present invention is to provide a device that includes a frusto-conical configuration. A feature of the device is that the configuration includes an inner wall defining a cavity having an upper aperture with a relatively small diameter and a lower aperture with a diameter relatively larger than the diameter of the upper aperture. An advantage of the device is that inner wall configuration together with the lower aperture being relatively larger than the upper aperture, reduces the quantity of dust engaging the frusto-conically configured inner wall of the frusto-conical configured spool member when compared to the cylindrically configured inner wall of the cylindrical spool member, and correspondingly reducing the static charge generated by the dust engaging the inner wall of the frusto-conical configured spool member, resulting in a correspondingly reduced chance of a spark occurring and causing a fire and/or explosion inside the spool member and/or the dust collection drum.

Still another object of the present invention is to provide a method for collecting dust discharged from a dust collector vessel that includes the device of this Summary together with a dust collection drum. A feature of the method is a 55 gallon drum manually elevated by a hydraulic lift such that the drum is vertically and axially aligned with and detachably secured to a drum cover, which is vertically and axially aligned with and detachably secured to a spool member that is secured to the dust collector vessel. An advantage of the method is that the hydraulic lift maintains the elevation of the drum until full, whereupon, the full drum is manually relocated and replaced by an empty drum manually positioned via the hydraulic lift.

Yet another object of the present invention is to provide a method for disposing dust from a dust collector vessel into a dust collection drum that includes the device of this Summary together with a dust collection drum having a drum cover clamp that secures the drum cover to the 55 gallon drum. A feature of the method is that the drum cover clamp is secured to a spool member such that the drum cover clamp is suspended beneath the drum cover after a full dust drum is detached from the drum cover then removed to a new location. An alternative feature of the method is that the drum cover clamp is secured to the drum cover such that the drum cover clamp is suspended beneath the drum cover after a full dust drum is detached from the drum cover then removed to a new location. An advantage of the method is that an empty 55 gallon dust drum can be readily secured to the drum cover via the suspended drum cover clamp after the dust drum is manually elevated by the hydraulic lift to engage the drum cover.

Briefly, the invention provides an explosion isolation device for collecting dust discharged from a hopper into a dust collection drum that includes a spool member having flanged upper and lower end portions, the flanged upper portion of said spool member being configured and dimensioned to be detachably secured to a cooperating lower portion of a hopper of a dust collector. The device further includes a drum cover having an aperture configured and dimensioned substantially similar to an aperture through the spool member, the drum cover being detachably secured to the flanged lower portion of the spool member.

Also, the device includes components for securing the flanged upper end portion of the spool member to the cooperating lower portion of the hopper of the dust collector; components for securing the drum cover to the flanged lower portion of the spool member; components for preventing dust from escaping from the flanged upper and lower end portions of the spool member; a drum cover clamp for securing the drum cover to a dust collection drum; and components for attaching the drum cover clamp to the spool member or alternatively to the drum cover, such that the drum cover clamp is suspended below the drum cover after a full dust collection drum is separated from the drum cover, whereby, the device and drum together, eliminate an airlock requirement to isolate the negative pressured dust collector from receiving air via a bottom aperture in the lower portion of the hopper, thereby preventing an explosion in the dust collector that exceeds the pressure rating of the device or the pressure rating of the dust collection drum.

BRIEF DESCRIPTION OF THE DRAWINGS

Objects, advantages and novel features of the present invention, as well as details of an illustrative embodiment thereof, will be understood from the following detailed description and attached drawings, wherein.

DESCRIPTION OF THE PREFERRED EMBODIMENT

Figure 1:
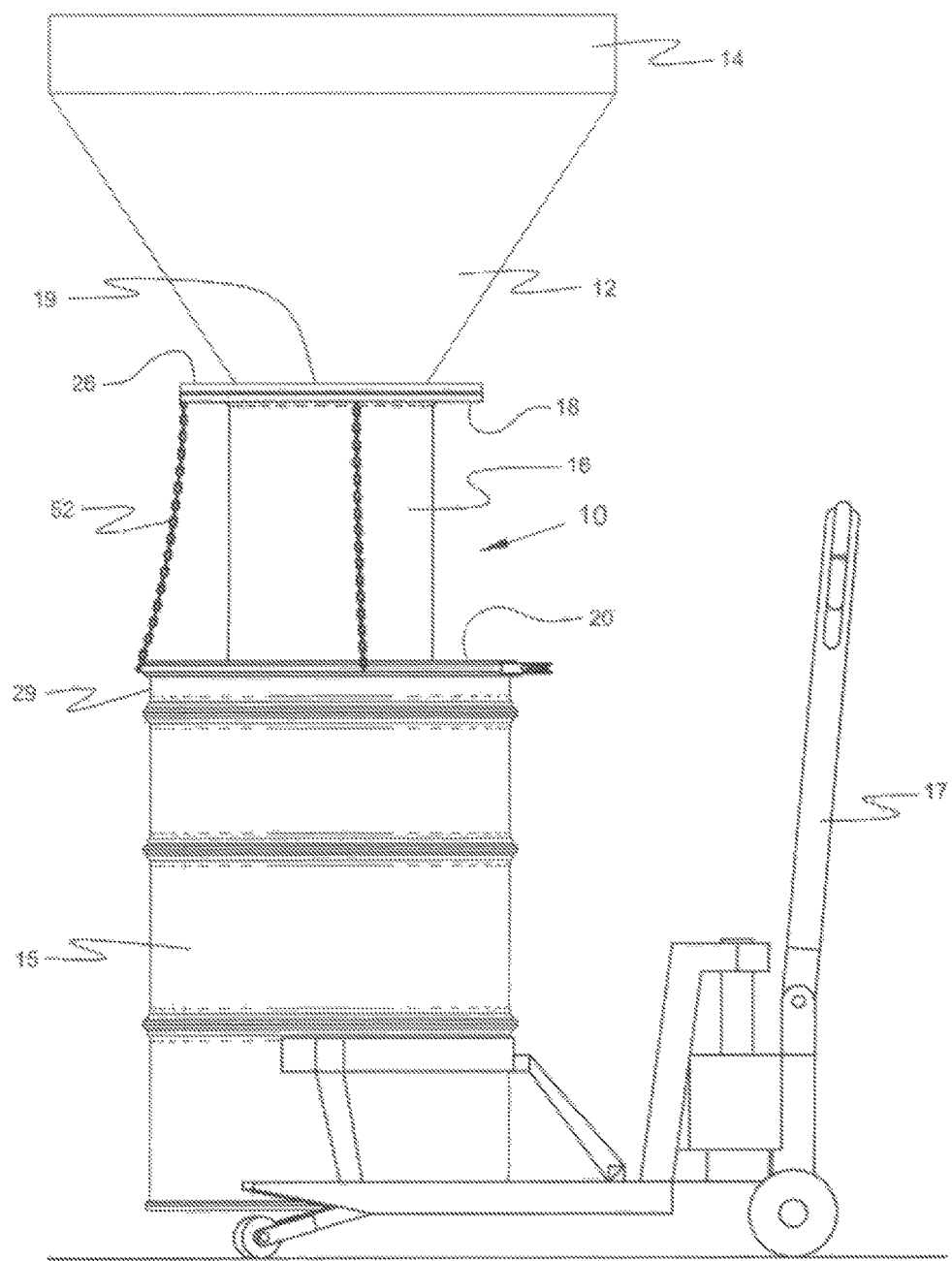
FIG. 1 is a front elevation view of an explosion isolation device secured to and below a dust collector hopper, and secured to and above a dust collection drum in accordance with the present invention.
Figure 2:
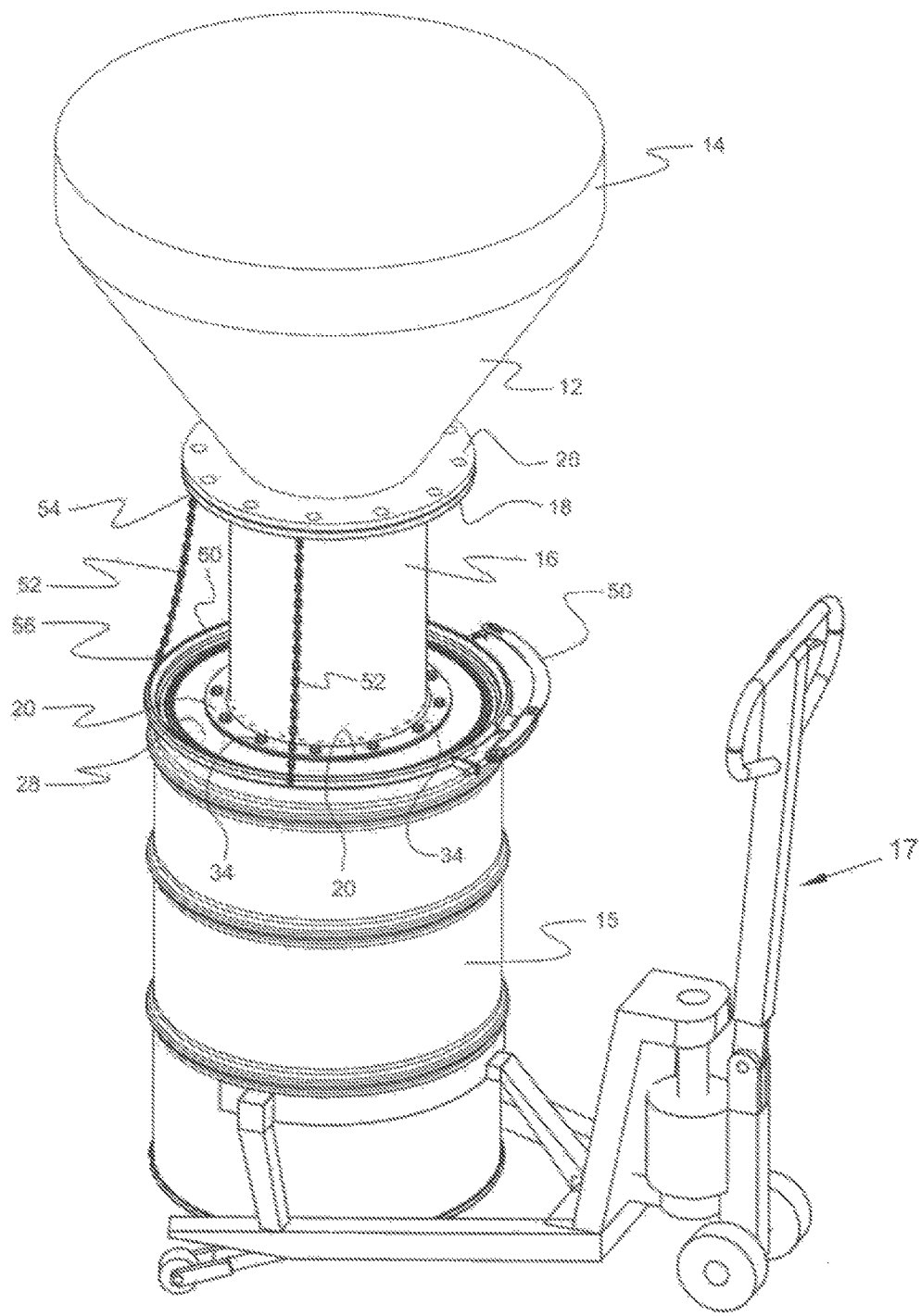
FIG. 2 is a front, top perspective view of the explosion isolation device of FIG. 1, but with the explosion isolation device secured to and below a relatively smaller hopper.
Figure 2A:
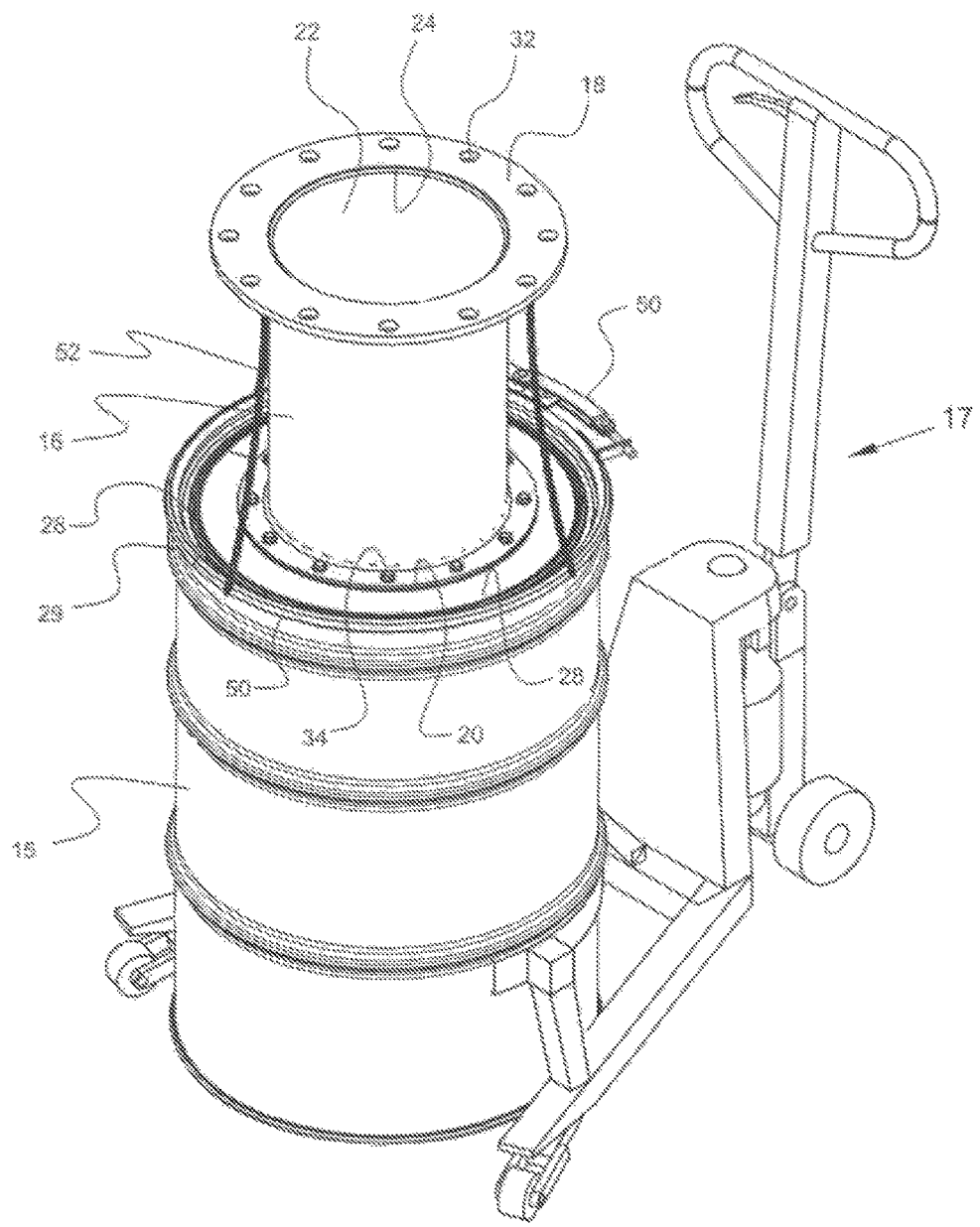
FIG. 2A is a Left side, top perspective view of FIG. 2, but with the hopper removed from the explosion isolation device of FIG. 2.
Figure 3:
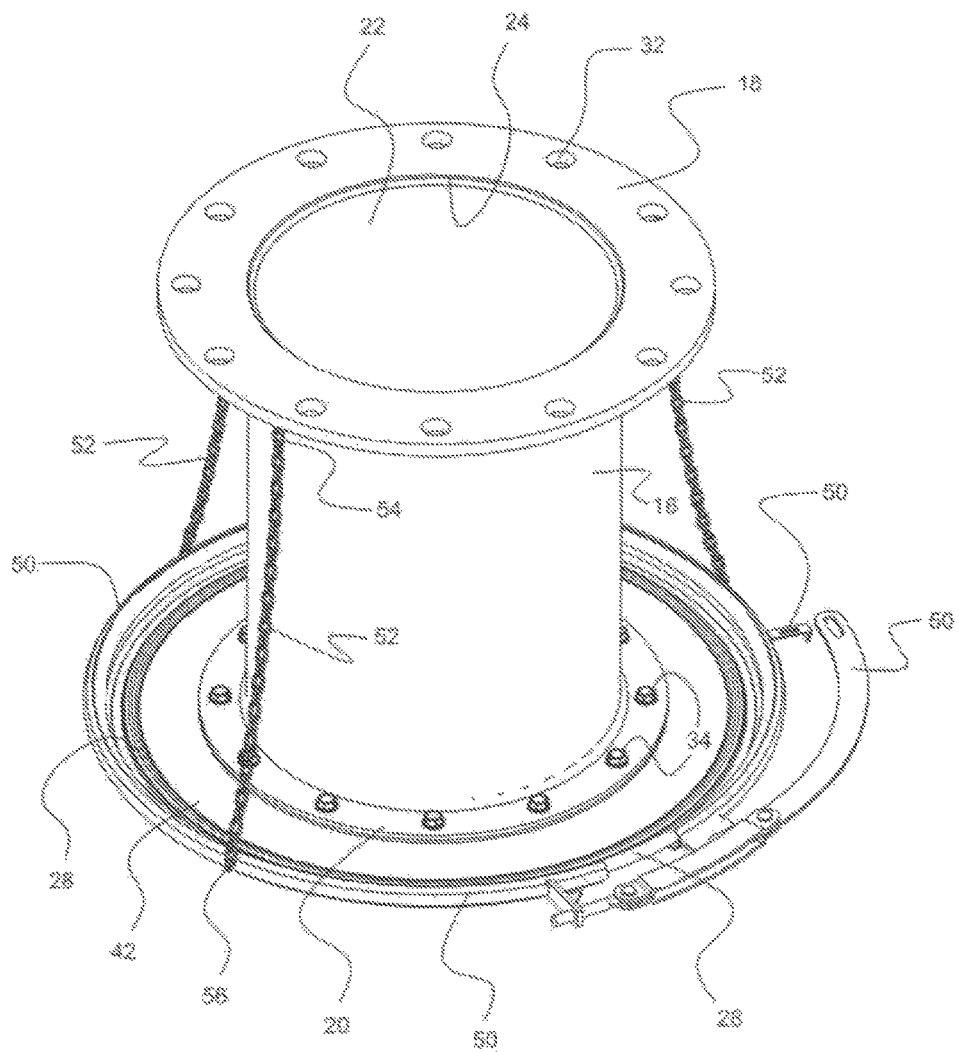
FIG. 3 is a top perspective view of the explosion isolation device of FIG. 1 detached from the dust collection drum, but with a drum cover clamp attached to the drum cover.
Figure 4:
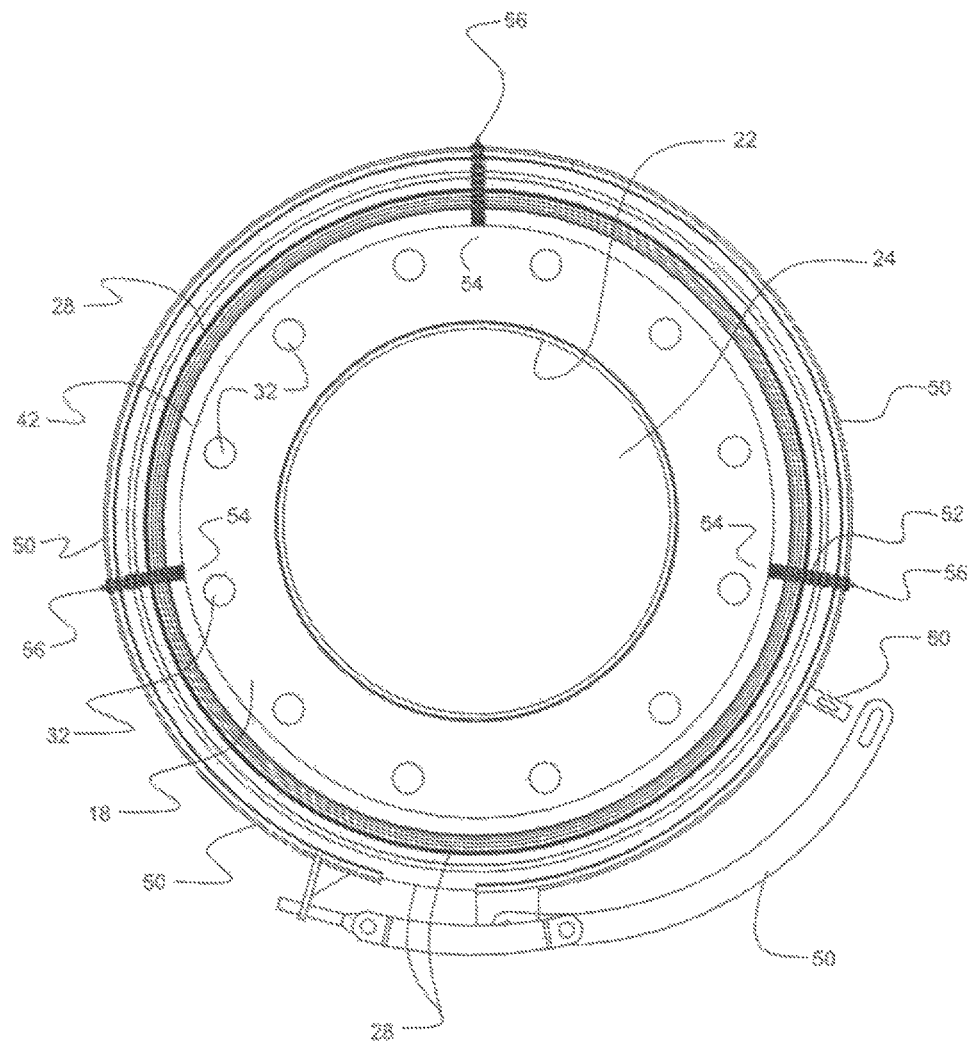
FIG. 4 is a top elevation view of an explosion isolation device in accordance with the present invention.
Figure 5:
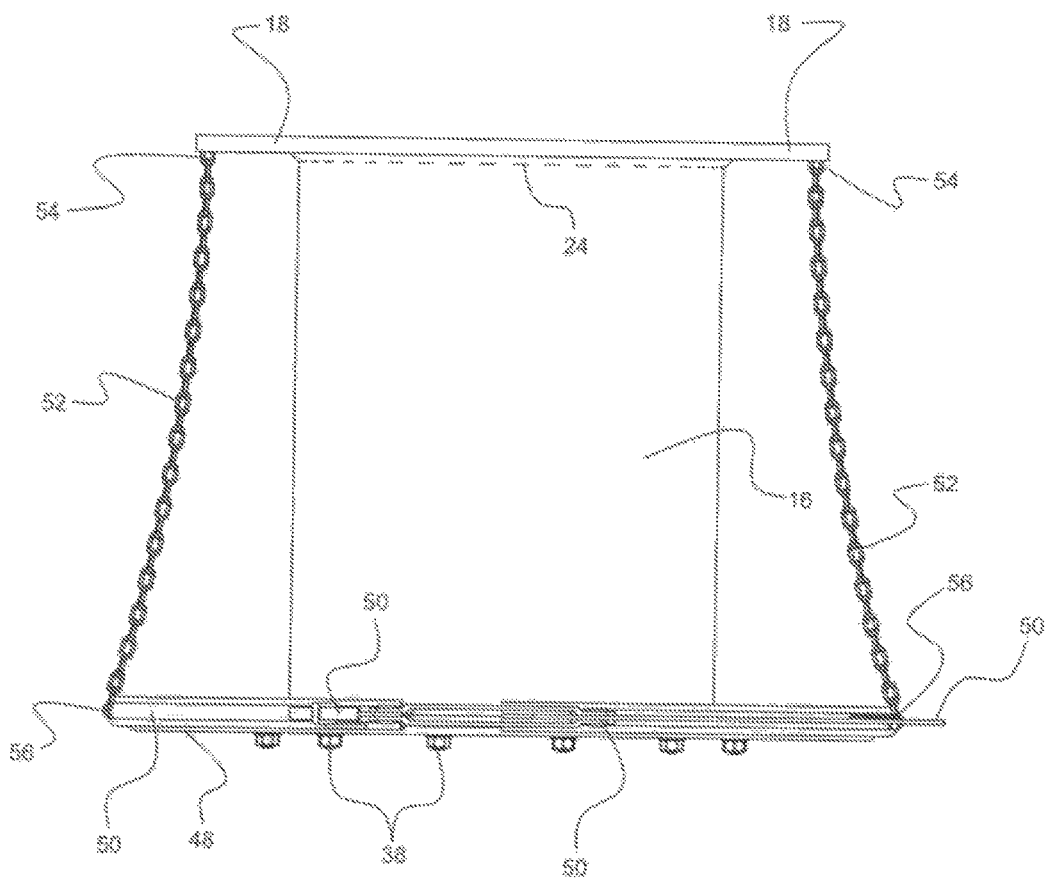
FIG. 5 is a front elevation view of the explosion isolation device of FIG. 4.
Figure 6:
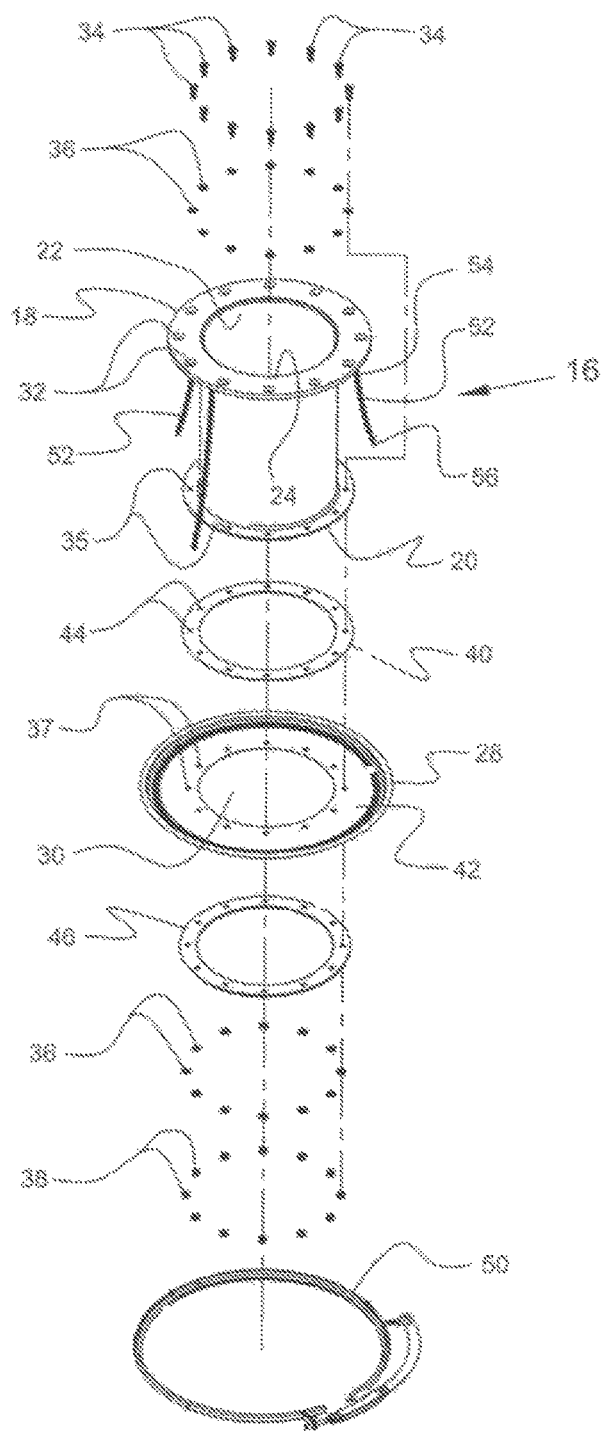
FIG. 6 is an exploded top perspective view of the explosion isolation device of FIG. 3.

Referring to the figures, and in particular to FIGS. 1-6, an explosion isolation device is depicted in accordance with the present invention and denoted as numeral 10. The explosion isolation device 10 is depicted in use below and detachably secured to a lower portion 12 of a hopper portion 14 of a dust collector (not depicted). Further, the device 10 is detachably secured to a dust collection drum 15 (typically a standard 55 gallon drum well known to those of ordinary skill) elevated and supported by a manually operated hydraulic barrel lift 17 well known to those of ordinary skill in the art. The device 10 is capable of withstanding the pressure of a typical explosion occurring in the dust collector, which is above the hopper 14. The device 10 and the dust collection drum 15 are each rated for 0.7 bars of pressure (10.1526 pounds per square inch), which enables the device 10 and drum 15 to withstand the standard burst pressures commonly found in dust collectors. The device 10 and drum 15 together, provide a system and method for eliminating an airlock (typically a rotary valve connected to the bottom of the lower portion 12 of the hopper 14) to isolate the negative pressured (vacuum pressured) dust collector from receiving air via a bottom aperture 19 in the lower portion 12 of the hopper 14, thereby preventing an explosion in the dust collector that exceeds the pressure rating of the device 10 and dust collection drum 15.

The explosion isolation device 10 includes a spool member 16 having a cylindrical or tubular configuration that is fabricated from a myriad of materials, including but not limited to carbon steel, stainless steel, aluminum and polymers. The spool member 16 includes flanged upper and lower end portions 18 and 20, and an inner cylindrical wall 22 defining an aperture 24 therethrough having a diameter substantially equal to the diameter of an aperture 19 in the lower portion 12 of the hopper portion 14 of the dust collector (not depicted). The spool member 16 further includes a predetermined longitudinal axial dimension that cooperates with the elevation of the drum 15 above ground level such that the flanged upper end 18 of the spool member 16 is detachably secured to a corresponding flange portion 26 of the lower portion 12 of the hopper portion 14 of the dust collector, and such that the flanged lower end 20 of the spool member 16 is detachably secured to the dust collection drum 15 while the drum 15 is elevated via the lift 17.

The flanged upper portion 18 of the spool member 16 is configured and dimensioned to be detachably secured to a cooperating flange 26 of the lower portion 12 of the hopper portion 14 of the dust collector via bolts and nuts (not depicted) cooperating with bolt apertures 32 in the flanged upper end portion 18 of the spool member 16, thereby maintain the position of the spool member 16 relative to the lower portion of the hopper of the dust collector. To prevent dust from escaping from between the flange 26 of the lower portion 12 of the hopper portion 14 and the flanged upper end portion 18 of the spool member 16, a gasket (not depicted) is disposed between a lower wall of flange 26 and an upper wall of the flanged upper portion 18. The preferred gasket is fabricated from white neoprene material, although other materials will suffice.

The explosion isolation device 10 further includes a drum cover 28 having an aperture 30 configured and dimensioned substantially similar to the aperture 24 through the spool member 16. The drum cover aperture 30 is centrally disposed such that the aperture 24 through the cylindrically configured spool member 16, the drum cover 28 and the drum cover aperture 30 are all axially aligned when the device 10 is in operation. The drum cover 28 is detachably secured to the flanged lower portion 20 of the spool member 16 via a combination of bolts 34 inserted through bolt apertures 35 in the flanged lower end portion 20, and bolt apertures 37 in the drum cover 28. The bolts 34 snugly secure the drum cover 28 to the flanged lower portion 20 via a combination of washers 36 and nuts 38 rotationally secured to the bolts 34 such that the washers 36 and nuts 38 are proximate to a lower wall of the drum cover 28, thereby maintaining the position of the spool member 16 relative to the lower portion 12 of the hopper 14 of the dust collector.

To prevent dust from escaping from between the flanged lower portion 20 and the drum cover 28, an upper gasket 40 is disposed between the flanged lower portion 20 and an upper wall 42 of the drum cover 28 such that bolt apertures 44 in the upper gasket 40 are aligned with the bolt apertures 35 and 37 in the respective flanged lower portion 20 and drum cover 28 to receive the bolts 34. The upper gasket 40 includes a central aperture with configurations and diameters substantially the same as respective upper and lower apertures in the spool member 16. The preferred material of fabrication for the upper gasket 40 is white neoprene, although alternative materials will suffice. To increase the sealing integrity of the upper gasket 40, a lower gasket 46 is disposed adjacent to a bottom wall 48 of the drum cover such that bolt apertures 44 in the lower gasket 46 are aligned with the bolt apertures 37 in the drum cover 28 to receive the bolts 34. The lower gasket 46 includes a central apertures with configurations and diameters substantially the same as respective upper and lower apertures in the spool member 16.

The upper and lower gaskets 40 and 46 prevent dust from escaping the device 10, but also can possibly cause an electrostatic charge to build up over the surface of the device 10 and drum 15. The electrostatic charge can reach a magnitude that can cause a spark, resulting in a possible explosion inside or outside of the device 10 and/or drum 15. To prevent an electrostatic charge from developing, ground clamps and cooperating ground straps or wires (not depicted) are secured to both the device 10 and drum 15 such that all static charge is discharged to a ground system proximate to the drum 15 location. The ground clamps, straps and system are well known to those of ordinary skill in the art.

The drum cover is detachably secured the dust collection drum 15 by a drum cover member or clamp 50 typical for fifty-five gallon drums that are well known to hose of ordinary skill in the art. The drum cover clamp 50 secures a periphery of the drum cover 28 to an upper annular portion 29 of the dust collection drum 15. The drum cover clamp 50 is secured to the spool member 16 (preferably at the flanged upper end 18) via a plurality of chains 52 or similar flexible members such as straps or ropes fabricated from metal, plastic or similar materials, (preferably three) having an upper end 54 welded or otherwise secured to the lower wall of the flanged upper end 18, and a lower end 56 of the chain 52 welded to the clamp 50 such that the chains 52 are radially separated substantially the same degree measurement. When the device 10 is in use and the drum 15 elevated via the lift 17 into engagement with the drum cover 28, the chains 52 "sag" slightly and the lift 17 supports and elevates the drum 15 above ground level a distance slight greater than the vertical distance separating the drum cover 28 and the clamp 50 when the clamp is detached from the drum 15 and allowed to "hang" from the chains 52, thereby allowing the dust full drum 15 to be manually lowered via the lift 17 until the top of the full drum 15 is lower in elevation that the hanging clamp 50, but maintaining the elevation of the bottom of the full drum 15 slight above ground level, resulting in the full drum 15 being manually removed via the lift 17 to a predetermined location.

Figure 7:
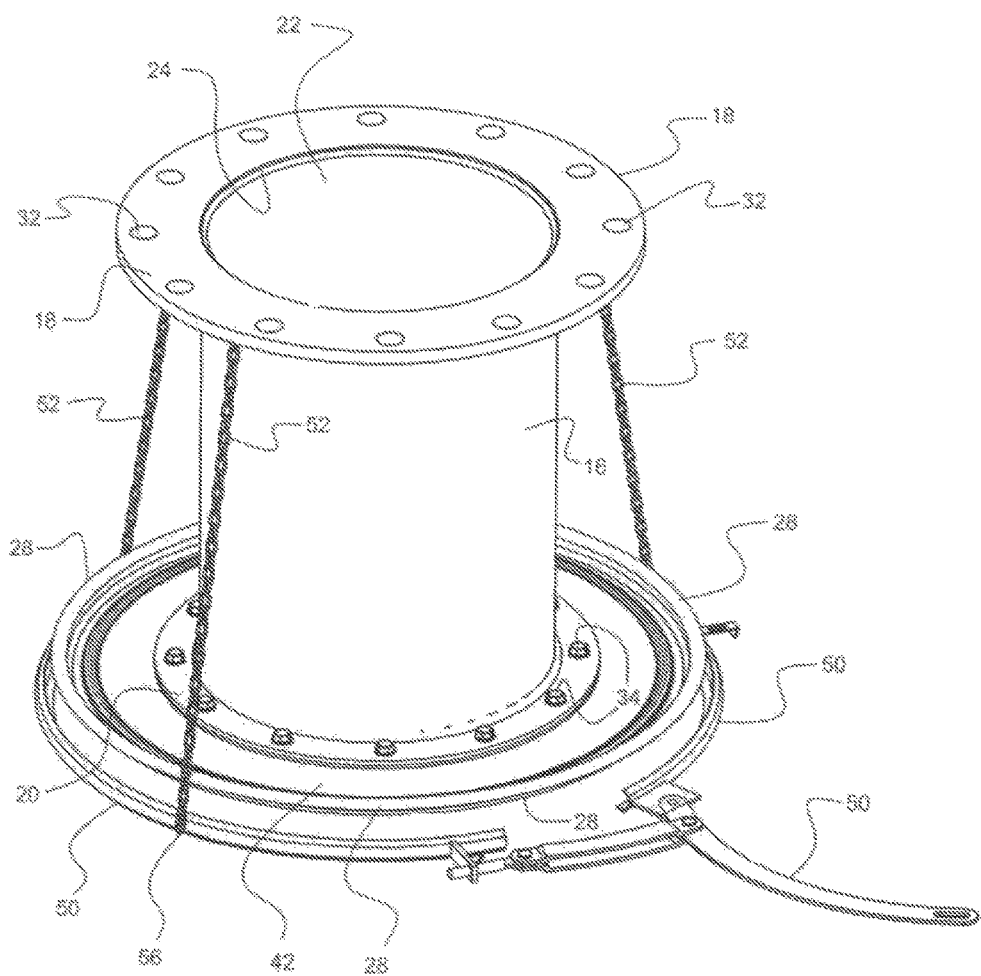
FIG. 7 is the top perspective view of the explosion isolation device of FIG. 3, but with the drum cover clamp in an open or detached position, and with the drum cover clamp supported beneath the drum cover via chains attached to a flanged upper end portion of a spool member in accordance with the present invention.

After the drum 15 is full of dust, further dust discharge into the drum 15 is terminated via a manual shutdown switch or a level detection circuit that uses level detectors and shutdown switches well known to hose of ordinary skill in the art. After operations have been shutdown, and the clamp 50 removed from the drum 15 (see FIG. 7), the clamp 50 is allowed to drop and hang, resulting in the clamp 50 being suspended by the chains 52 and circumferentially disposed about the drum 15 (not depicted) such that the drum cover clamp 50 is beneath and relatively close to the bottom wall 48 of the drum cover 28. The dust full drum 15 is manually replaced by an empty drum 15 by manually lowering the full drum 15 via the hydraulic lift 17 until the top of the full drum 15 is lower than the clamp 50. The full drum 15 is then moved to a predetermined location and an empty drum 15 is positioned beneath the clamp 50. The empty drum 15 is manually elevated via the lift 17 until the top of the empty drum 15 inserts through the clamp 50 and engages the drum cover 28, whereupon, the clamp 50 is manually elevated to engage the top of the drum 15 and drum cover 28, then manually urged to a locked positioned such that the drum cover 28 is tightly secured upon the empty drum 15, whereby, a dust collection drum 15 is isolated from a dust collector such that dust discharged from the hopper 14 and ultimately deposited into the dust collection drum 15 will not result in an explosion that the explosion isolation device 10 and dust collection drum 15 cannot withstand.

Figure 8:
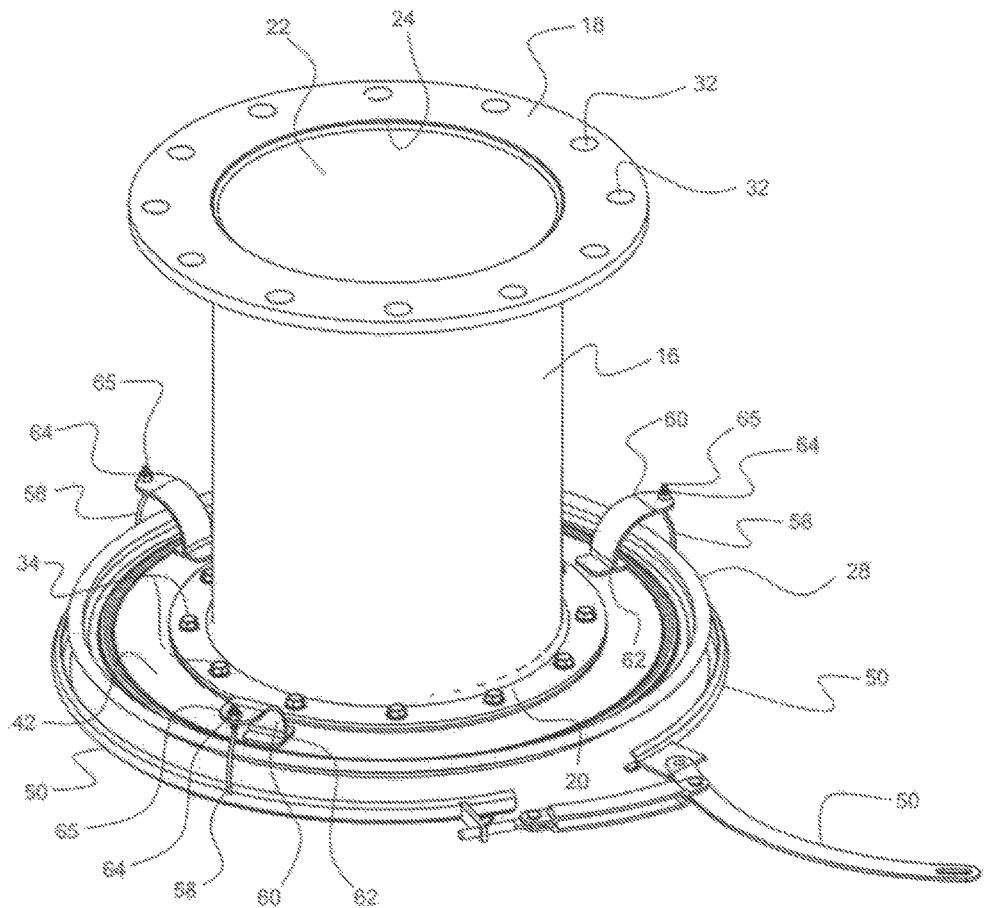
FIG. 8 is the top perspective view of FIG. 7, but with the drum cover clamp supported beneath the drum cover via rods slidably secured to arcuate metal strips secured to a top wall of the drum cover.

Referring to FIG. 8, an alternative method for securing the drum cover clamp 50 to the device 10 in accordance with the present invention is depicted. The alternative method includes the replacement of the chains 50 with relatively short rods 58 secured to the upper wall 42 of the drum cover 28 via arcuate metal strips 60 welded to the upper wall 42 via a base portion 62. The rods 58 are slidably secured to the arcuate metal strips 60 via retaining nuts 64 rotationally secured to upper end portions 65 of the rods 58 such that the rods 58 continuously engage the arcuate metal strips 60 irrespective of the position of the nuts 64 relative to the arcuate strips 60. The rods 58, metal strips 60 and base portion 62 are fabricated from metal and secured to the upper wall 42 such that each of the rods 58 are radially separated a substantially equal degree measurement. The length of the rods 58 ultimately position the drum cover clamp 50, after the clamp is manually urged in an open or release position, below the drum cover 28 a distance relatively smaller than the vertical elevation a dust collection drum 15 is ultimately lowered when full and manually relocated from the hopper 14 of the dust collector to a storage site. The lower position of the drum cover clamp 50 relative to the drum cover 28 is maintained by retaining nuts 64 engaging a top wall of the arucate strips 60 as the rods slide downward together with the drum cover clamp 50, when the clamp 50 is lowered after being manually opened or disposed in a released position relative to the drum cover 28.

Figure 9:
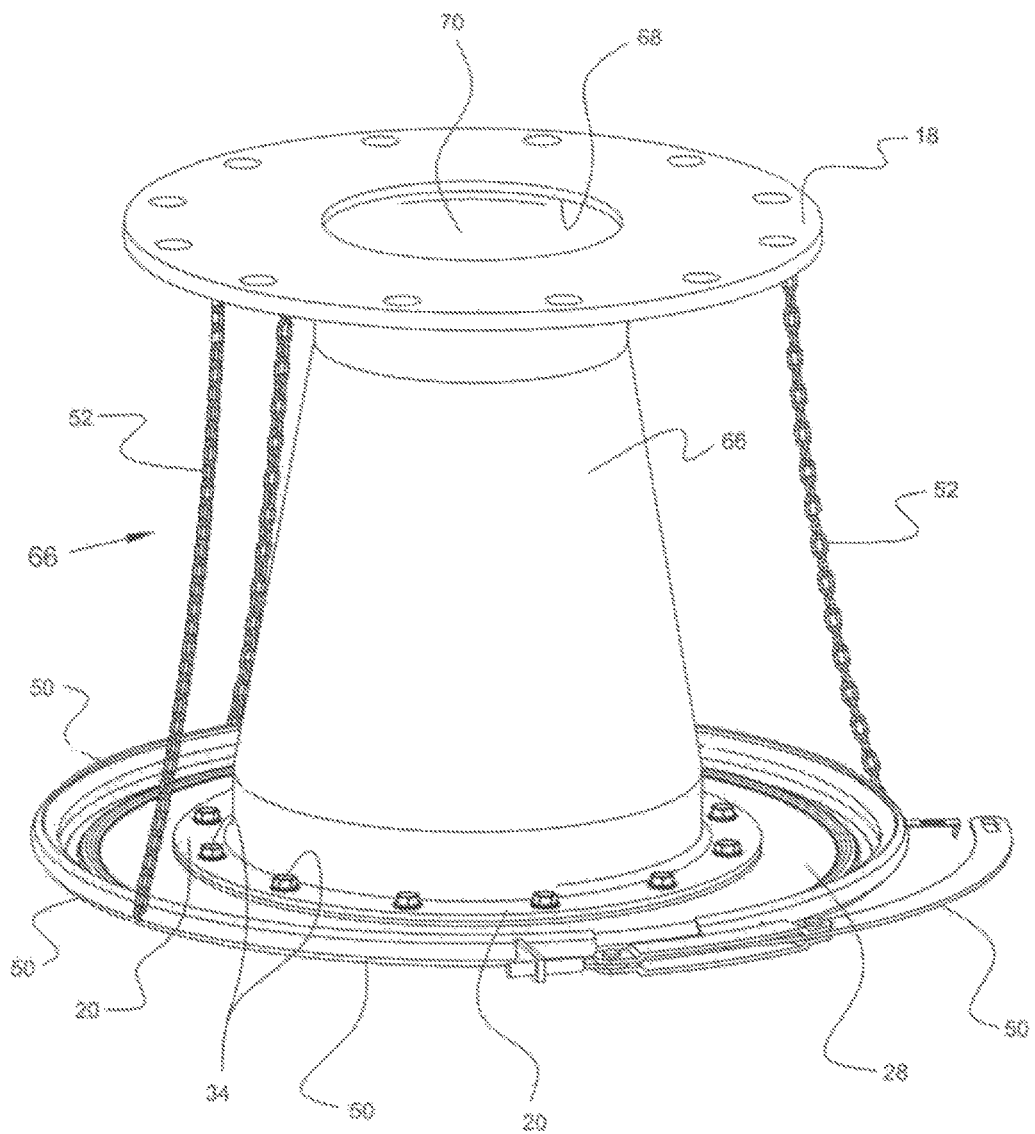
FIG. 9 is the top perspective view of FIG. 7, but with the spool member having a frusto-conical configuration, and with the flanged upper end portion having substantially the same outer diameter, but with the central aperture having a relatively smaller diameter in accordance with the present invention.

Referring to FIG. 9, an alternative spool member 66 in accordance with the present invention is depicted. The alternative spool member 66 includes a frusto-conical configuration with the flanged upper end portion 18 having substantially the same outer diameter, but with a central aperture 68 having a relatively smaller diameter. The central aperture 68 of the flanged upper end portion 18 may or may not be equal to the diameter of the aperture in the lower portion 12 of the hopper 14 of the dust collector. Alternatively, the flanged upper end portion 18 can have an outer diameter that equals the outer diameter of the flange 26 of the lower portion 12, and the end portion 18 can have a central aperture 68 equal to and aligned with the central aperture in the flange 26 of the lower portion 12.

The frusto-conical configured spool member 66 further includes a lower aperture (not depicted) in the flanged lower end portion 20. The lower aperture includes a diameter substantially equal to the diameter of an aperture (not depicted) in the drum cover 28 with both the lower aperture and drum cover aperture diameters being relatively larger than the diameter of the aperture 68 in the flanged upper end portion 18. The drum cover aperture is centrally disposed such that the aperture 68 in the flanged upper end portion 18, the lower aperture in the in the flanged lower end portion 20, and the drum cover 28 are all vertically and axially when the device 10 is in operation. The drum cover 28 aperture includes a diameter relatively larger than the diameter of the aperture in the lower portion 12 of the hopper 14 of the dust collector and the central aperture 68 of the upper end portion 18, thereby reducing the quantity of dust engaging a frusto-conically configured inner wall 70 (that defines an inner cavity of the frusto-conical configured spool member 66) when compared to the cylindrically configured inner wall 22 of the spool member 16, and correspondingly reducing the static charge generated by the dust engaging the inner wall 70 of the frusto-conical configured spool member 66, resulting in a correspondingly reduced chance of a spark occurring and causing a fire and/or explosion inside the spool member 66 and/or the dust collection drum 15.

In operation, a method for collecting dust discharged from a dust collector includes the step of:

providing a spool member 16 having flanged upper and lower end portions 18 and 20, the flanged upper portion 18 of the spool member 16 is configured and dimensioned to be detachably secured to a cooperating lower portion 12 of a hopper 14 of a dust collector;

providing a drum cover 28 having an aperture 30 configured and dimensioned substantially similar to an aperture 24 through the spool member 16, the drum cover 28 is detachably secured to the flanged lower end portion 20 of the spool member 16;

securing the flanged upper end portion 18 of the spool member 16 to the cooperating lower portion 12 of the hopper 14 of the dust collector;

securing the drum cover 28 to the flanged lower end portion 20 of the spool member 16;

preventing dust from escaping from the flanged upper and lower end portions 18 and 20 of the spool member 16;

providing a drum cover clamp 50 for securing the drum cover 28 to a dust collection drum 15; and attaching the drum cover clamp 50 to the drum cover 28, whereby, a dust collection drum 15 is isolated from a hopper 14 of a dust collector such that dust discharged from the hopper 14 and ultimately deposited into the dust collection drum 15 will not cause an explosion in the dust collector that exceeds the pressure rating of the device 10 and dust collection drum 15.

In operation, an alternative method for collecting dust discharged from a dust collector includes the step of:

detachably securing an upper end 18 of a spool member 16 to a dust collector;

detachably securing a drum cover 28 to a lower end 20 of the spool member 16, the drum cover 28 having an aperture 30 configured and dimensioned to cooperate with an aperture 24 through the spool member 16;

preventing dust from escaping from the upper and lower ends 18 and 20 of the spool member 16;

providing a drum cover clamp 50 for detachably securing the drum cover 28 to a drum 15; and detachably securing the drum cover clamp 50 to the spool member 16, whereby, a drum 15 when full of dust is removed from the drum cover 28, whereupon, the drum cover clamp 50 is suspended beneath the drum cover 28 until an empty drum 15 is disposed proximate to the drum cover clamp 50, the empty drum 15 is ultimately elevated to engage the drum cover 28 and secured to the drum cover 28 via the drum cover clamp 50, thereby minimizing the time to remove dust form the dust collector, and minimizing the possibility of causing an explosion and/or starting a fire.

The foregoing description is for purpose of illustration only and is not intended to limit the scope of protection accorded this invention. The scope of protection is to be measured by the following claims, which should be interpreted as broadly as the inventive contribution permits.

The invention claimed is:

1. A combination explosion isolation device and dust collection drum for preventing an explosion in a vacuum pressured dust collector that exceeds a preselected explosion pressure for the vacuum pressured dust collector when collecting dust in said dust collection drum, said combination comprising:

a rigid non-deformable spool member having a predetermined longitudinal axial dimension and flanged upper and lower end portions, said flanged upper end portion of said spool member being configured and dimensioned to be detachably secured to a cooperating lower portion of a hopper of a dust collector, said spool member having a pressure rating above a preselected explosion pressure for the dust collector, said spool member being fabricated from metal and includes a cylindrical configuration having an aperture therethrough with a diameter that promotes dust flow from the lower portion of the hopper of the dust collector to said aperture in said drum cover, and a predetermined axial dimension that enables said flanged upper end portion of said spool member to be detachably connected to a corresponding flange portion of the lower portion of the hopper of the dust collector, resulting in a rigid, non-deformable spool member that maintains said cylindrical configuration and predetermined axial dimension when the pressure within said spool member exceeds the preselected explosion pressure for the dust collector;

a dust collection drum having a drum cover with an aperture configured and dimensioned substantially similar to an aperture through said spool member, said drum cover being detachably secured to said flanged lower end portion of said spool member, said dust collection drum and said drum cover having a pressure rating above a preselected explosion pressure for the dust collector;

means for securing said flanged upper end portion of said spool member to the cooperating lower portion of the hopper of the dust collector, said securing means preventing dust from escaping between said flanged upper end portion of said spool member and said cooperating lower portion of the hopper, said securing means preventing air from entering between said flanged upper end portion of said spool member and said cooperating lower portion of the hopper, and said securing means having a pressure rating above a preselected explosion pressure for the dust collector;

means for joining said drum cover to said flanged lower end portion of said spool member, said joining means preventing dust from escaping between said drum cover and said flanged lower end portion of said spool member, said joining means preventing air from entering between said drum cover and said flanged lower end portion of said spool member, and said joining means having a pressure rating above a preselected explosion pressure for the dust collector, said means for joining said drum cover to said flanged lower portion of said spool member includes a plurality of bolts inserted through bolt apertures in said flanged lower portion of said spool member and through cooperating bolt apertures in said drum cover after a gasket has been inserted between said drum cover and said flanged lower portion of said spool member, whereupon, retaining washers and nuts are rotationally secured to said bolts such that the position of said drum cover relative to said flanged lower portion of said spool member is maintained, thereby providing a pressure rating for said joining means above a preselected explosion pressure for the dust collector;

means for detachably securing said drum cover to said dust collection drum, said detachable securing means preventing dust from escaping between said drum cover and said dust collection drum, said detachable securing means preventing air from entering between said drum cover and said dust collection drum, said detachable securing means and said dust collection drum each having a pressure rating above a preselected explosion pressure for the dust collector; and means for elevating and maintaining a preselected elevation for said spool member and said dust collection drum with said drum cover detachably secured to said dust collection drum, said elevation maintaining means cooperating with said predetermined longitudinal axial dimension of said spool member to enable said drum cover to be elevated and joined to said flanged lower end portion of said rigid non-deformable spool member when said spool member is secured to a lower portion of the hopper of the dust collector, thereby enabling said dust collection drum to receive dust from the vacuum pressured dust collector; whereby, said explosion isolation device and said dust collection drum when vertically and rigidly joined together prevent an explosion in a vacuum pressured dust collector that exceeds a preselected explosion pressure for the vacuum pressured dust collector, and promote dust flow from the dust collector into said dust collection drum and simultaneously prevent air from entering the vacuum pressured dust collector via a bottom aperture in the lower portion of the hopper of the vacuum pressured dust collector.

2. The combination of claim 1 wherein said preselected explosion pressure of said explosion isolation device and of said dust collection drum is at least 0.7 bars.

3. The combination of claim 1 wherein said means for securing said flanged upper end portion of said spool member to the cooperating lower portion of the hopper of the dust collector includes a plurality of bolts inserted through apertures in the lower portion of the hopper of the dust collector and through cooperating apertures said flanged upper end portion of said spool member after a gasket has been inserted between said flanged upper end portion and said cooperating lower portion of the hopper, whereupon, retaining washers and nuts are rotationally secured to said bolts such that the position of said spool member relative to the lower portion of the hopper of the dust collector is maintained, thereby providing a pressure rating for said securing means above a preselected explosion pressure for the dust collector.

4. The combination of claim 1 wherein said drum cover includes an aperture configured and dimensioned substantially similar to said aperture through said cylindrically configured spool member.

5. The combination of claim 4 wherein said aperture in said drum cover is centrally disposed such that said aperture through said spool member, said drum cover and said aperture in said drum cover are all axially aligned and rigidly and vertically secured together, thereby reducing the quantity of dust engaging the inner wall of said spool member and correspondingly reducing the static charge generated by said engagement, resulting in a reduced chance of an explosion occurring in the dust collector.

6. The combination of claim 1 wherein said spool member includes a frusto-conical configuration having an upper aperture with a diameter substantially equal to the diameter of an aperture in the lower portion of the hopper of the dust collector.

7. The combination of claim 6 wherein said spool member frusto-conical configuration includes a lower aperture in said lower end portion of said spool member having a diameter relatively larger than a diameter of an aperture in said upper end portion of said spool member, thereby preventing a static charge that would result in a dust explosion in said spool member and/or the dust collection drum.

8. The combination of claim 6 wherein said aperture in said drum cover is centrally disposed such that said aperture through said frusto-conically configured spool member, said drum cover and said aperture in said drum cover are all axially and rigidly aligned when said device is in operation, thereby reducing the quantity of dust engaging the inner wall of said spool member and correspondingly reducing the static charge generated by said engagement.

9. A combination explosion isolation device and dust collection drum for preventing an explosion in a vacuum pressured dust collector that exceeds a preselected explosion pressure for the vacuum pressured dust collector when collecting dust in said dust collection drum, said combination comprising:

a rigid non-deformable spool member having flanged upper and lower end portions, said flanged upper end portion of said spool member being configured and dimensioned to be detachably secured to a cooperating lower portion of a hopper of a dust collector, said spool member having a pressure rating above a preselected explosion pressure for the dust collector;

a dust collection drum having a drum cover with an aperture configured and dimensioned substantially similar to an aperture through said spool member, said drum cover being detachably secured to said flanged lower end portion of said spool member, said dust collection drum and said drum cover having a pressure rating above a preselected explosion pressure for the dust collector;

means for securing said flanged upper end portion of said spool member to the cooperating lower portion of the hopper of the dust collector, said securing means preventing dust from escaping between said flanged upper end portion of said spool member and said cooperating lower portion of the hopper, said securing means preventing air from entering between said flanged upper end portion of said spool member and said cooperating lower portion of the hopper, and said securing means having a pressure rating above a preselected explosion pressure for the dust collector;

means for joining said drum cover to said flanged lower end portion of said spool member, said joining means preventing dust from escaping between said drum cover and said flanged lower end portion of said spool member, said joining means preventing air from entering between said drum cover and said flanged lower end portion of said spool member, and said joining means having a pressure rating above a preselected explosion pressure for the dust collector;

means for detachably securing said drum cover to said dust collection drum, said detachable securing means preventing dust from escaping between said drum cover and said dust collection drum, said detachable securing means preventing air from entering between said drum cover and said dust collection drum, said detachable securing means and said dust collection drum each having a pressure rating above a preselected explosion pressure for the dust collector, said detachable securing means includes a spool member fabricated from a rigid non-deformable material and having flanged upper and lower end portions, said flanged upper end portion of said spool member being configured and dimensioned to be detachably secured to a cooperating lower portion of a hopper of a dust collector, said flanged lower end portion of said spool member being configured and dimensioned to be detachably secured to said drum cover and axially aligned with an aperture in said drum cover, said spool member having a pressure rating above a preselected explosion pressure for the dust collector, said spool member being fabricated from an electrically conductive metal and includes a frusto-conical configuration having an upper aperture with a diameter substantially equal to the diameter of an aperture in the lower portion of the hopper of the dust collector, said frusto-conical configuration including a lower aperture in said lower end portion of said spool member having a diameter relatively larger than the diameter of the aperture in said upper end portion of said spool member, said aperture in said drum cover being centrally disposed and axially aligned with said aperture through said cylindrically configured spool member, said drum cover and said aperture in said drum cover the lower portion of the hopper being rigidly secured to said flanged upper end portion of said spool member via nut and bolt combinations, said flanged lower end portion of said spool member being rigidly secured to said drum cover via nut and bolt combinations, and said drum cover being rigidly secured to the dust collection drum, thereby reducing the quantity of dust engaging the inner wall of said spool member and correspondingly reducing the static charge generated by said engagement that could result in a dust explosion in said dust collection system, and simultaneously preventing dust from escaping and/or air from entering said dust collection system that would reduce the pressure rating for said dust collection system, thereby allowing an explosion in the dust collector that exceeds the preselected explosion pressure for the dust collector; and means for elevating and maintaining a preselected elevation for said spool member and said dust collection drum with said drum cover detachably secured to said dust collection drum, said elevation maintaining means enabling said drum cover to be elevated and joined to said flanged lower end portion of said rigid non-deformable spool member when said spool member is secured to a lower portion of the hopper of the dust collector; whereby, said device and said dust collection drum together maintain a substantially rigid vertical position to promote dust flow from the dust collector into the dust collection drum and simultaneously prevent air from entering the vacuum pressured dust collector via a bottom aperture in the lower portion of the hopper of the vacuum pressured dust collector, thereby preventing an explosion in the dust collector that exceeds the preselected explosion pressure for the dust collector.

* * * * *